United States Patent

Mager et al.

[11] Patent Number: 6,136,939
[45] Date of Patent: Oct. 24, 2000

[54] ORGANOSILANE OLIGOMERS

[75] Inventors: Michael Mager, Leverkusen; Markus Mechtel, Köln, both of Germany

[73] Assignee: Bayer Aktiengesellschaft, Leverkusen, Germany

[21] Appl. No.: 09/423,498

[22] PCT Filed: May 11, 1998

[86] PCT No.: PCT/EP98/02728

§ 371 Date: Nov. 8, 1999

§ 102(e) Date: Nov. 8, 1999

[87] PCT Pub. No.: WO98/52992

PCT Pub. Date: Nov. 26, 1998

[30] Foreign Application Priority Data

May 23, 1997 [DE] Germany .......................... 197 21 626
Feb. 23, 1998 [DE] Germany .......................... 198 07 634

[51] Int. Cl.[7] .................................................. C08G 77/04
[52] U.S. Cl. .................. 528/33; 528/35; 528/36; 528/37
[58] Field of Search ................. 528/33, 35, 36, 528/37

[56] References Cited

FOREIGN PATENT DOCUMENTS

WO 97/01565  1/1997  WIPO .

Primary Examiner—Edward J. Cain
Attorney, Agent, or Firm—Joseph C. Gil; Thomas W. Roy

[57] ABSTRACT

Oligomers soluble in organic solvents and obtainable by condensing identical or different monomers of the formula

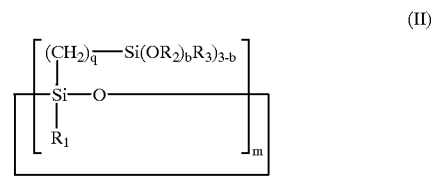

in which $R_1$ means $C_1$–$C_6$ alkyl or $C_6$–$C_{14}$ aryl, $R_2$ means hydrogen, alkyl or aryl, if b is 1, or alkyl or aryl, if b is 2 or 3, $R_3$ means alkyl or aryl, m means 3 to 6, q means 2 to 10 and, b means 1, 2 or 3, are suitable for coating plastics, mineral and metallic substrates and glass.

7 Claims, No Drawings

ORGANOSILANE OLIGOMERS

BACKGROUND OF THE INVENTION

This invention relates to organosilane oligomers which are suitable as a coating composition.

DE 196 03 241 and WO 94/06807 disclose numerous cyclic organosilanes from which inorganic/organic hybrid systems may be produced by a sol/gel process. These materials may be used for coating surfaces. The resultant coatings are distinguished by elevated transparency, good solvent resistance and high resistance to mechanical wear combined with excellent resilience.

When coating porous substrates, for example porous inorganic particle or mineral surfaces (for example stone surfaces), the monomeric organosilanes penetrate deeply into the material and must accordingly be applied in an uneconomically large quantity, for example in multiple coats, in order to protect the surface effectively. Only once this is achieved are the coatings suitable, for example, as anti-graffiti coatings.

The object of the invention was to overcome these disadvantages. The coating materials to be developed to achieve this object should, however, be soluble in organic solvents so that they may be used at all.

This object is achieved with oligomers of certain cyclic organosilanes.

SUMMARY OF THE INVENTION

The present invention accordingly provides oligomers (I) soluble in organic solvents and obtainable by condensing identical or different monomers of the formula II

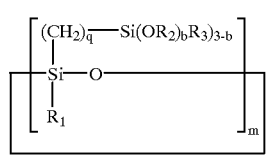

(II)

in which m means 3 to 6, preferably 4, q means 2 to 10, preferably 2, b means 1, 2 or 3, preferably 1 or 2, $R_1$ means $C_1$–$C_6$ alkyl or $C_6$–$C_{14}$ aryl, preferably methyl or ethyl, $R_2$ means hydrogen, alkyl or aryl, if b is 1, or alkyl or aryl, if b is 2 or 3, and $R_3$ means alkyl or aryl, preferably methyl.

DETAILED DESCRIPTION OF THE INVENTION

Examples of compounds of the formula (II) are:

(II-1) cyclo-{OSiCH$_3$[(CH$_2$)$_2$Si(OH)(CH$_3$)$_2$]}$_4$,
(II-2) cyclo-{OSiCH$_3$[(CH$_2$)$_2$Si(OCH$_3$)(CH$_3$)$_2$]}$_4$,
(II-3) cyclo-{OSiCH$_3$[(CH$_2$)$_2$Si(OCH$_3$)$_2$CH$_3$]}$_4$,
(II-4) cyclo-{OSiCH$_3$[(CH$_2$)$_2$Si(OC$_2$H$_5$)$_2$CH$_3$]}$_4$,
(II-5) cyclo-{OSiCH$_3$[(CH$_2$)$_2$Si(OC$_2$H$_5$)$_3$]}$_4$.

Suitable organic solvents for the oligomers are, for example, mono- and polyfunctional alcohols, such as methanol, ethanol, n-butanol, ethylene glycol, as well as mixtures of aromatic hydrocarbons and aliphatic ketones or esters.

The oligomers (I) may be produced from the monomers of the formula (II) or directly from the starting products for the production of the monomers of the formula (II), wherein starting products which may be considered are those compounds of the formula (II) which contain a halogen atom, for example a chlorine, bromine or iodine atom, instead of the group OR$_2$. The oligomers (I) are preferably produced using the corresponding chlorosilanes. The reaction proceeds in the presence of water and/or alcohol. The hydrogen chloride gas formed in this reaction is stripped or washed out, optionally in the presence of a base (for example NH$_3$). In the event that the resultant oligomer mixture still contains Si—Cl groups, it may, for example, be post-treated with further base in the presence of water and/or alcohols.

The alcoholysis and hydrolysis of chlorosilanes are known in principle to the person skilled in the art.

Surprisingly, the oligomers I are soluble in the solvents and do not crosslink during the production thereof, despite having multifunctional reactive groups. In accordance with the process described, for example, in WO 94/06807 (sol/gel process), it is not possible to stop the polymerisation process so as to obtain soluble oligomers (I) which are stable in storage. Hydrolysis and condensation continue until an infusible and insoluble gel is obtained.

These oligomers are suitable not only for coating particles, in particular particles having inorganic constituents, preferably purely inorganic particles, but also for coating plastics in order to improve mechanical strength, as an anti-graffiti coating on mineral and metallic substrates or organic coatings (for example on buildings or vehicles) and for hydrophobising substrates, for example of stone or glass.

These oligomers are optionally used by (co-)condensation with alkoxides, for example those of the formula III, and/or nanoparticles (IV), $$M_1(OR_4)_y \qquad (III)$$

in which $M_1$ means Si, Sn, Ti, Zr, B or Al, $R_4$ means alkyl or aryl, preferably $C_1$–$C_4$ alkyl and y means 4 in the case of Si, Sn, Ti, Zr and 3 in the case of B or Al.

Examples of alkoxides of the formula III are:

(III-1) Si(OC$_2$H$_5$)$_4$
(III-2) B(OC$_2$H$_5$)$_3$
(III-3) Al(O-i-C$_3$H$_7$)$_3$
(III-4) Zr(O-i-C$_3$H$_7$)$_4$.

Examples of nanoparticles (IV) are finely divided metal oxides or metal oxide hydroxides of the elements Si, Sn, In, Ti, Zr, B or Al, for example silica sols which in particular contain organic solvents. The preferred average particle size thereof, determined using an ultracentrifuge, is in the range from 1 to 100 nm, preferably of 1 to 50 nm; they are accordingly referred to as "nanoparticles".

The coatings preferably contain 0.1 to 100 wt. % of oligomers (I), 0 to 70 wt. % of nanoparticles (IV), 0 to 99.9 wt. % of alkoxide (III) and 0 to 10 wt. % of catalyst (V). The coatings particularly preferably contain 20 to 80 wt. % of oligomers (I), 20 to 80 wt. % of alkoxide (III), 0 to 50 wt. % of nanoparticles (IV) and 0 to 5 wt. % of catalyst (V).

Suitable catalysts (V) are organic and inorganic acids or bases, for example HCO$_2$H, CH$_3$COOH, HCl, NH$_4$OH and alkali metal hydroxides as well as salts containing fluorine, such as NaF or NH$_4$F. The added metal alkoxides, such as Ti(OC$_2$H$_5$)$_4$ and Ti(O—i—C$_3$H$_7$)$_4$, may themselves be catalytically active. Metal soaps such as zinc octoate or dibutyltin laurate may also be used.

In a preferred embodiment, the oligomers (I) are initially mixed, optionally in a solvent, with alkoxides (III) and/or nanoparticles (IV), and reacted together optionally in the presence of a catalyst (V). In order to increase reactivity and to reduce the loss of low-boiling, highly volatile starting materials from the reaction mixture, it is particularly favourable initially to react the reaction mixture with water, optionally in the presence of a catalyst, wherein, reactive, less volatile condensation products are formed. DE-OS 196 03 242 and WO 94/06897 disclose details relating to the production of the condensation products, optionally in the presence of alkoxides. For example, polyfunctional organosilanes are stirred together with the alkoxides, a solvent, water and a catalyst and reacted for a certain time, before films or, after complete reaction (gelation), also mouldings may be obtained from these solutions.

After a certain reaction time, this coating solution is applied onto the materials using suitable processes, for example by brushing, spraying or dipping, the volatile constituents are evaporated and the resultant coating is optionally post-cured thermally.

EXAMPLES

Example 1

Production of 1,3,5,7-tetramethyl-1,3,5,7-tetra-(2-(dichloromethyl-silyl)ethylene)cyclotetrasiloxane 229.3 g (0.667 mol) of 1,3,5,7-tetramethyl-1,3,5,7-tetravinylcyclotetrasiloxane, 125 g of xylene and 36 mg of platinum catalyst were heated to 60° C. while being stirred. 252.1 g (2.668 mol) of methyldichlorosilane were then added dropwise. An exothermic reaction occurred. Once dropwise addition was complete, the mixture was stirred for a further 2 hours while being refluxed. After cooling to room temperature, the mixture was perfused with $N_2$, filter auxiliary (diatomaceous earth) was added and the mixture filtered. The product was used for further syntheses without further investigation.

Example 2

Production of the condensation product of 1,3,5,7-tetramethyl-1,3,5,7-tetra-(2-(diethoxymethylsilyl)ethylene)cyclotetrasiloxane 600 g of the solution produced according to Example 1 of 1,3,5,7-tetramethyl-1,3,5,7-tetra(2-(dichloromethylsilyl)ethylene)cyclotetrasiloxame were initially introduced into a vessel. 500 g of ethanol were introduced thereto under the liquid surface at a pressure of approx. 500 mbar. The mixture was then distilled to a pressure of 10 mbar and a temperature of 60° C. and perfused with $N_2$. A further 250 g of ethanol were then added and the mixture distilled to a pressure of 10 mbar and a temperature of 100° C. and then perfused with $N_2$. Ammonia was then introduced up to saturation via a gas inlet line and the mixture stirred for 4 hours. Excess ammonia was then removed and ammonium chloride removed by filtration. The filtrate was neutralised with $Na_2CO_3$, combined with filter auxiliary (diatomaceous earth) and heat treated to a temperature of 130° C. at a pressure of 10 mbar.

The product was obtained as a clear liquid having a viscosity of 80 mPa·s, a density of 1.00 g/ml and a residual hydrolysable chlorine content of 7 ppm. The molecular weight distribution was determined by high speed gel permeation chromatography (SGPC) using dichloromethane as the solvent with IR and RI detection. The condensation product of 1,3,5,7-tetramethyl-1,3,5,7-tetra-(2-(diethoxymethylsilyl)-ethylene)cyclotetrasiloxane assumed the form of a continuous molecular weight distribution having a number average molecular weight ($M_n$) of 1350 g/mol and a weight average molecular weight of 3355 g/mol.

What is claimed is:

1. An oligomer which is soluble in organic solvents and obtained by condensing identical or different monomers corresponding to the formula

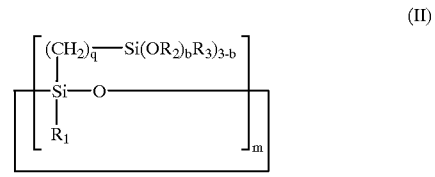

(II)

wherein $R_1$ represents $C_1$–$C_6$ alkyl or $C_6$–$C_{14}$ aryl, $R_2$ represents hydrogen, alkyl or aryl when b is 1, and alkyl or aryl when b is 2, $R_3$ represents alkyl or aryl, m has a value of 3 to 6, q has a value of 2 to 10 and b has a value of 1, 2 or 3.

2. The oligomer of claim 1 wherein $R_1$ represents methyl or ethyl, $R_2$ represents hydrogen, methyl or ethyl when b is 1, and methyl or ethyl when b is 2, $R_3$ represents methyl, m has a value of 4, q has a value of 2 and b has a value of 1 or 2.

3. The oligomer of claim 1 wherein a portion of the $OR_2$ groups are replaced by chlorides.

4. A coating composition comprising an oligomer which is soluble in organic solvents and obtained by condensing identical or different monomers corresponding to the formula

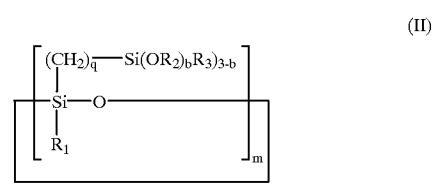

(II)

wherein $R_1$ represents $C_1$–$C_6$ alkyl or $C_6$–$C_{14}$ aryl, $R_2$ represents hydrogen, alkyl or aryl when b is 1, and alkyl or aryl when b is 2, $R_3$ represents alkyl or aryl, m has a value of 3 to 6, q has a value of 2 to 10 and b has a value of 1, 2 or 3.

5. The coating composition of claim 4 which optionally additionally comprises an alkoxide corresponding to the formula $$M_1(OR_4)_y \qquad (III)$$

wherein $M_1$ represents Si, Sn Ti, Zr, B or Al, $R_4$ represents alkyl or aryl and y has a value of 4 when $R_4$ represent Si, SN Ti or Zr and 3 when $R_4$ represents B or Al, or optionally nanoparticles comprising a member selected from the group consisting of finely divided metal oxides and metal oxide hydroxides of the elements Si, Sn, In, Ti, Zr, B and Al.

6. The coating composition of claim 5 which comprises 0.1 to 100 wt. % of said oligomer, 0 to 99.9 wt. % of said alkoxide and 0 to 50 wt. % of nanoparticles and 0 to 10 wt. % of an organic or inorganic, acidic or basic catalyst.

7. The coating composition of claim 5 which comprises 20 to 80 wt. % of said oligomer, 20 to 80 wt. % of said alkoxide and 0 to 50 wt. % of nanoparticles and 0 to 5 wt. % of an organic or inorganic, acidic or basic catalyst.

* * * * *